May 23, 1961     R. L. WRIGHT, JR     2,985,016
DIFFERENTIAL TEMPERATURE RECORDER
Filed June 20, 1957
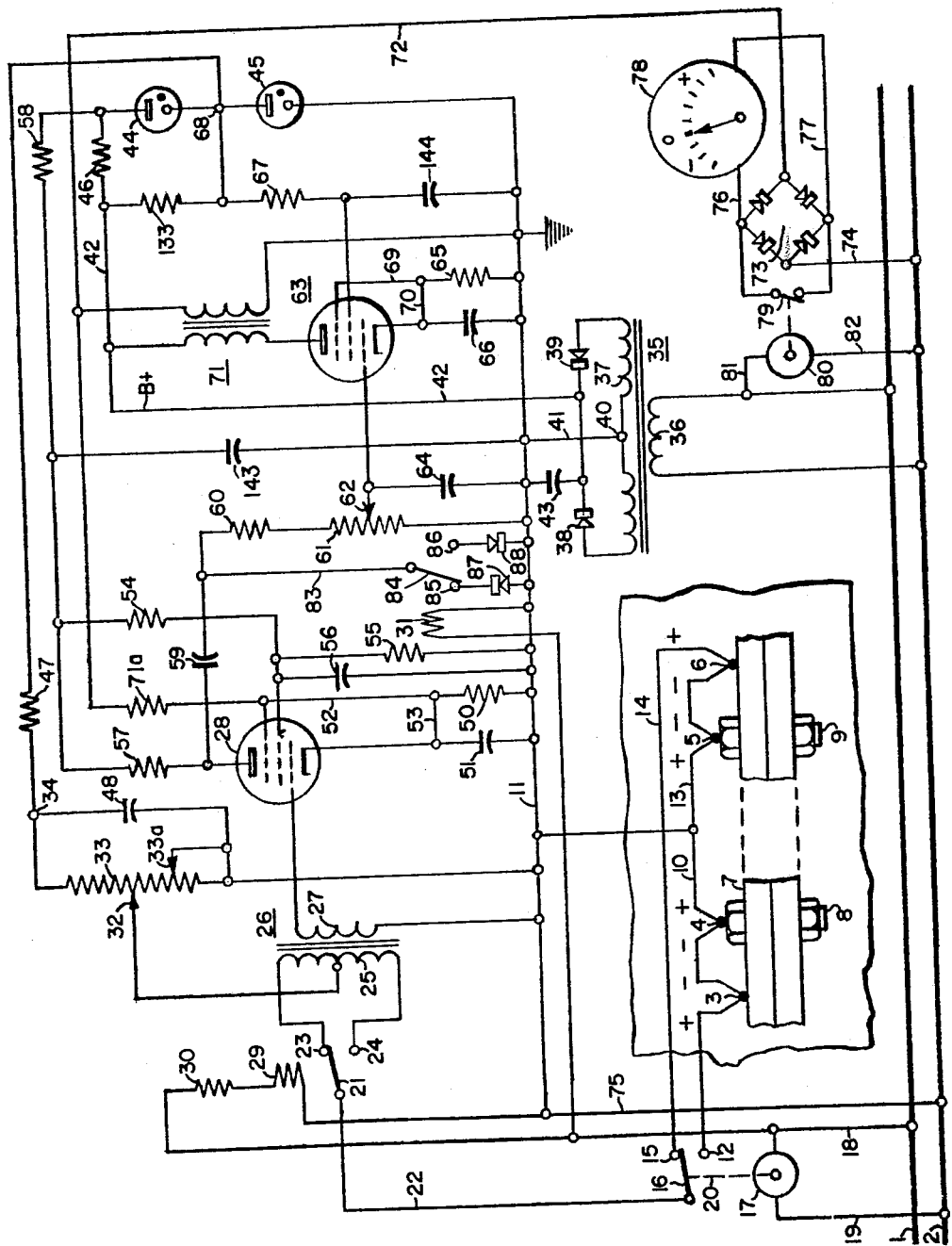

United States Patent Office 2,985,016
Patented May 23, 1961

2,985,016
DIFFERENTIAL TEMPERATURE RECORDER
Robert L. Wright, Jr., Linthicum, Md., assignor to Westinghouse Electric Corporation, East Pittsburgh, Pa., a corporation of Pennsylvania
Filed June 20, 1957, Ser. No. 666,990
6 Claims. (Cl. 73—341)

This invention relates to a differential temperature recorder and, more particularly, to a temperature recorder utilizing thermocouple outputs responsive to differences in temperature at different localities on a turbine or similar device.

In starting a steam turbine capable of delivering large power outputs, it is necessary to provide steam flow into the turbine over a sufficiently long period of time in order to bring all parts of the turbine up to proper temperature thus eliminating damaging large temperature differentials between different parts of the turbine.

It is therefore an object of this invention to provide for a turbine or any other machine a differential temperature recorder capable of detecting and indicating temperature difference between bolted members and the securing bolts.

It is another object of this invention to provide a differential temperature recorder capable of indicating greater flange than bolt temperature in a turbine.

It is another object of this invention to provide a differential temperature recorder capable of detecting and indicating greater bolt than flange temperature in a turbine over a limited range.

It is another object of this invention to provide a differential temperature recorder capable of preventing greater bolt than flange temperatures from being displayed as a reverse relationship.

It is still another object of this invention to provide a differential temperature recorder that is operative on a fail-safe basis.

Other objects, purposes and characteristic features will become apparent as the description of the invention progresses.

In practicing this invention, a plurality of thermocouples are connected in back to back relationship so that like temperatures will produce zero or substantially zero voltage output. The thermocouple output, which is a differential output, is then passed through a chopper or vibrator and wave shaping transformer for application to the grid of a voltage amplifier tube. Output of the voltage amplifier tube is then applied to a power amplifier tube which, in turn, provides sufficient output for driving a suitable recorder. The circuit is also provided with a second chopper capable of providing a voltage amplifier output path to ground of low resistance during periods of extreme hotter bolt than flange conditions on a steam turbine. The low resistance path thus prevents any input to the recording meter which might indicate a false temperature.

The single figure of the drawing is a diagrammatic view of a differential temperature recording circuit involving this invention.

The differential temperature recorder circuit shown in the drawing is provided with a constant voltage source (not shown) applied to the conductors 1 and 2. As will be explained hereinafter, this constant voltage source is used to supply power to the control vibrators and amplifying tubes as necessary.

The thermocouples 3, 4, 5 and 6 are shown positioned on a flange and bolts representing positions on a steam turbine or similar machine. The thermocouples 3 and 6 are shown applied to a flange 7, while the thermocouples 4 and 5 are shown applied to the bolts 8 and 9, respectively. The thermocouples 3 and 4, as previously stated, are connected in a back to back or opposite polarity relationship so that a common temperature between the flange 7 and the bolt 8 produces a bucking volage resulting in a net zero output. Likewise, the thermocouples 5 and 6 are connected in a back to back relationship so that their output will be zero during times of common temperature between the flange 7 and the bolt 9. One output conductor 10 of the thermocouples 3 and 4 is connected to a ground conductor 11, while the other output conductor of the thermocouples 3 and 4 is connected to terminal 12. Likewise, one output conductor 13 of the thermocouples 5 and 6 is connected to the ground conductor 11, while the other output conductor 14 is connected to terminal 15. Associated with terminals 12 and 15 is a movable contact 16 capable of being driven to selectively make contact with the terminals 12 and 15 by a timing motor 17 which is connected across the constant alternating current voltage conductors 1 and 2 by the conductors 18 and 19. The timing motor 17 is connected to the movable contact member 16 by a linkage 20 and may thus effect the selective operation mentioned at suitable time periods; for example, on the order of every two minutes. The movable contact member is connected to a movable vibrator contact member 21 by a conductor 22. The movable vibrator contact member 21 is selectively movable between two extreme positions to alternately make contact with terminals 23 and 24. These terminals 23 and 24 are connected to the outside terminals of a center-tapped primary winding 25 of a transformer 26. The transformer 26 is provided with a secondary output winding 27 connected between the control grid of a voltage amplifier tube 28 and the ground conductor 11. The vibrator and transformer 26 form substantially square wave output impulses.

The vibrator contact member 21 is provided with a suitable driving winding 29 connected across the constant voltage conductors 1 and 2, through a current limiting resistor 30. Another vibrator winding 31 is connected in parallel to this circuit. With the windings 29 and 31 of the vibrators connected in parallel across the constant voltage conductors 1 and 2, these vibrators are arranged to operate synchronously.

In order to pass a signal through the amplifier circuit, to be explained hereinafter, for the purpose of operating the system on a fail-safe basis, the primary winding 25 of the transformer 26 is provided with a bias voltage through the tap 32 of the bias resistor 33 connected between the ground conductors 11 and a positive potential level 34.

The bias resistor 33 is provided with a bypass capacitor 48 for eliminating any unwanted variations in the voltage across the bias resistor 33. In addition, the bias resistor 33 is provided with a variable tap 33a capable of shunting a portion of the resistor 33 for increasing current flow through the bias resistor.

The positive potential level 34 is established through the use of a power transformer 35 having a primary 36 connected across the constant voltage conductors 1 and 2. The transformer 35 is provided with a secondary 37 connected across the rectifiers 38 and 39 for providing a full wave rectification of the output voltage of the secondary winding 37. The secondary winding 37 is center tapped as at 40 and connected to the ground conductor 11 by the conductor 41. The output of the rectifiers 38 and 39 is then applied to a B+ conductor 42 for supplying B supply to the amplifying stages to be explained hereinafter. Connected between the full wave rectified output of the rectifiers 38 and 39 and the ground conductor 11 is a filter capacitor 43. A similar filter capacitor 143 is connected between the ground 11 and the junction, or conductor, between resistors 54 and 58. The combination of the rectifiers 38 and 39 and the filter capacitors 43 and 143 thus presents a stable direct current voltage for use in the plate circuits of the amplifiers to be explained hereinafter.

In order to assure a constant voltage level on the B supply conductor 42, two gas type glow tubes 44 and 45 are connected in series with a dropping resistor 46 between the B supply conductor 42 and the ground conductor 11. A stabilizing resistor 133 is connected in parallel with tube 44. Since it is characteristic of glow type tubes to have a certain definite voltage drop between the two elements in the tube during conducting periods, the voltage level between the two series tubes is then used by being applied through the dropping resistor 47 to the positive potential point 34 for the bias resistor 33.

The voltage amplifying tube 28 is preferably a pentode having an anode and a cathode, and suppressor grid, screen grid and control grid. The cathode of the voltage amplifier tube 28 is connected to ground through a cathode resistor 50 and bypass filter capacitor 51. The suppressor grid is connected to the cathode, through the conductors 52 and 53. The screen grid is provided with a voltage that is positive with respect to ground by the voltage divider comprising the resistors 54 and 55, the resistor 55 being provided with a bypass filter capacitor 56. The anode of the tube 28 is connected through an anode resistor 57 and a decoupling resistor 58 to the glow tube 44. The anode is provided with an output circuit through a coupling capacitor 59 and load resistors 60 and 61, to the ground conductor 11. The load resistor 61 is provided with a tap 62 connected to the control grid of the power amplifier 63. The control grid of the power tube 63 is provided with a bypass filter condenser 64 for eliminating high frequency input signals from the input to the amplifying stage.

The power tube 63, like that of the voltage amplifier 28, is a pentode having an anode and a cathode, and a control grid, a screen grid, and a suppressor grid. The cathode is connected to the ground conductor 11, through the cathode resistor 65 and bypass filter capacitor 66. The screen grid is provided with a positive voltage through the resistor 67 from the voltage level of the point 68 between the glow tubes 44 and 45. The suppressor grid of the tube 63 is connected to the cathode through the conductors 69 and 70. The anode of the tube 63 is connected to the B supply conductor 42 through the primary of an output transformer 71. The secondary of the output transformer 71 is connected to the suppressor grid of the tube 28 through the current limiting resistor 71a and through a parallel path including the output conductor 72, two of the terminals of a full wave rectifier bridge 73 to ground through the conductor 74, conductor 2, conductor 75 and conductor 11. The other two terminals of the full wave rectifier bridge 73 provide an output through the conductors 76 and 77 to an indicating instrument 78. The instrument may be a recording type of instrument. Connected across the terminals of the indicating instrument 78 is a timer control switch 79 driven by a timer motor 80 which is connected across the conductors 1 and 2 by the conductors 81 and 82. The purpose of the timer motor 80 and its operating contacts 79 is to provide a shunt for the indicating instrument for a selected period of time following the application of power to the constant voltage conductors 1 and 2. At the expiration of this time, the timer motor 80 interrupts the contactor 79 allowing the instrument 78 to operate.

Connected between the coupling capacitor 59 and the load resistor 60 is a conductor 83 connected to a movable contact member 84 of the vibrator 31. The movable contact member 84 is movable to selectively engage the contact points or terminals 85 and 86. The terminal 85 is connected through a rectifier 87, poled as shown, to the ground conductor 11. The terminal 86 is connected through a rectifier 88, oppositely poled to the rectifier 87, to the ground conductor 11.

Operation of the differential temperature recorder will now be described. With the turbine inoperative and the temperature of the flange 7 and bolts 8 and 9 being the same, it can be seen that the output of the thermocouples 3, 4 and 5, 6 is zero. With the timer motor 17 operative to the position shown in the drawings, the movable contact member 16 would connect the thermocouples 5 and 6 across the upper half of the primary winding 25 of the transformer 26. Since the output of the back to back connected thermocouples 5 and 6 at this moment is zero, the voltage developed by the upper half of the transformer 26 is also zero. During a following half cycle of the vibrator 29, moving its contact 21 to terminal 24, thermocouples 5 and 6 would be connected across the lower half of the primary winding 25. Since the steam turbine is not in operation, the thermocouple output voltage is zero and thus, no voltage is developed across the lower half of the transformer winding 25 due to the thermocouples. However, the tap 32 being adjusted up the bias resistor 33 to a voltage level above the ground conductor 11 causes, due to transformer 35 and associated elements, a current flow through the center tap of the primary winding 25 of the transformer 26 through the movable contact member 21 of the vibrator 29 in either of its extreme positions through the conductor 22, the contact member 16 of the timer 17, the conductor 14, the thermocouples 5 and 6 or 3 and 4, depending upon the position of the contact 16, to the ground conductor 11. This flow of current then produces an output voltage in the transformer 26 at the frequency of the movable contact member 21 of the vibrator 29. The output voltage is reproduced in the secondary winding 27 and applied to the control grid of the tube 28. This small voltage is then amplified by the tube 28 and appears as a voltage developed across the load resistors 60 and 61 for application to the control grid of the power amplifier tube 63. The signal is then amplified by the power amplifier tube 63 developed across the primary winding of the output transformer 71 and delivered through the secondary winding of the output transformer 71, the conductor 72, rectifier bridge 73, conductors 76 and 77 to the indicating instrument 78. Since the output voltage to the indicating instrument is a result of the bias voltage only, the indicating instrument records only the bias voltage. It, therefore, can be seen that adjustment of the tap 32 and tap 33a can be made at this time to cause the indicating instrument to read zero temperature on its calibrated scale.

If we now assume that the turbine is being brought up to temperature at a normal rate, a differential temperature will occur with the flange 7 being of greater temperature than either of the bolts 8 or 9. When this occurs, the output voltage of the thermocouple rises in a direction to add to the bias voltage obtained from the tap 32 to cause a greater output signal from the tube 28 and tube 63 causing the voltage applied to the indicator 78 to increase in a positive direction indicating a greater than zero temperature. The amount of increase on the indicating instrument is directly proportional to the output voltage developed by the thermocouples 3 through 6.

The positive voltage of the thermocouples added to the bias voltage of the bias resistor 33 produces an instantaneous output voltage on the secondary of the transformer 26 of one polarity. This, in turn, produces an output voltage on the tube 28 of a polarity that, when applied to the conductor 83 and synchronous vibrator contact 84 of the vibrator 31 operating synchronously with the vibrator 29, is of the wrong polarity to pass through the rectifier 87 or 88 associated with the position of the movable contact member 84. That is, if we assume that the vibrator contact member 84 is in contact with the contact member 85, the polarity of the output voltage in the anode of the tube 28 is such that it will not pass through the rectifier 87 to ground. Likewise, when the vibrator contact member 21 is in contact with the contact point 24 and the contact member 84 of the vibrator 31 is in contact with contact point 86, the polarity of the output voltage of the tube 28 is not of the proper polarity to pass through the rectifier 88. During this period, the timer 17 first applies one of the two pairs of thermocouples to the indicating system and then the other of the two pairs of thermocouples to the indicating system. With the pairs of thermocouples placed at widely separated points along the flange of the turbine, a good average temperature recording can be obtained.

If we now assume that the turbine is being shut down with the result that the bolts 8 and 9 have higher temperatures than the flange 7, the pairs of thermocouples will, at this time, produce a voltage of a polarity opposing the normal bias voltage supplied by the tap 32 on the bias resistor 33. If the thermocouple reverse voltage is of less value than the bias voltage supplied by the tap 32, the signal output voltage from the tube 28 is still of a polarity such that the rectifiers 87 and 88 will not allow passage of the voltage to ground. It, therefore, can be seen that since the thermocouple voltage is reducing the effects of the bias voltage and reducing the output voltage in the secondary winding 27, that the output voltage of the tubes 28 and 63 will also be of reduced value thus causing the indicating instrument 78 to indicate a value less than the zero calibrated on its scale. If we assume that the shut down of the turbine is being accomplished too rapidly causing the securing bolts 8 and 9 to retain a temperature far greater than the flange 7, the reverse output voltage of the thermocouples becomes greater than the bias voltage supplied by the tap 32 of the bias resistor 33. Since this voltage now exceeds the voltage of the bias resistor tap 32 and is of a polarity opposing the bias resistor tap voltage, the instantaneous output voltage of the secondary winding 27 becomes opposite in phase to the voltage associated with a turbine being brought up to temperature or back to inoperative condition within a normal shut down period. The output of tube 28 therefore is also opposite in phase to the normal voltage of a normally operating turbine and, therefore, is grounded through the conductor 83, the movable contact member 84 of the synchronous vibrator 31, the rectifier 87 or 88 now of low resistance to this voltage phase, to the ground conductor 11. Since this signal is now provided with a low resistance path to ground, no input signal is provided to the power amplifier 63 causing the output voltage of this amplifier to be zero, and thus the indicating instrument to read its maximum minus temperature.

If the synchronous vibrator 31 and the circuit, comprising the conductor 83, the synchronous vibrator contact 84 and the rectifiers 87 and 88, were not present in the circuit, the output voltage of the tube 28 would be applied to the power amplifier 63, amplified and applied to the indicating instrument 78. This output would now appear on the indicating instrument as a positive temperature indicating that the flange 7 was at a greater temperature than the bolts 8 and 9. This indication would then be a false indication of an undesirable nature. For this reason, the circuit including the conductor 83 is used causing the instrument 78 to indicate the proper direction, even though the magnitude is not properly displayed.

It should also be clear that since the instrument is calibrated with the zero indication actually occurring during current flow periods within the instrument which is, in turn, provided by the bias resistor 33 causing an input voltage to be applied to the first amplifying stage, a fail-safe system is provided. Thus, if any part of the circuit should fail, the bias output would not be indicated in the output of the power amplifier tube 63 and the instrument 78 would display a negative temperature. Since the operator would know whether the turbine is being shut down or not, he would further know whether to expect a negative temperature indication. In any case, if the negative temperature indication on the indicator 78 reaches a maximum negative indication during shut down periods, the operator would know to take action to reduce the temperature differential between the flange and the bolts.

Since numerous changes may be made in the above described construction and different embodiments of the invention may be made without departing from the spirit and scope thereof, it is intended that all the matter contained in the foregoing description or shown in the accompanying drawing shall be interpreted as illustrative and not in a limiting sense.

I claim as my invention:

1. A differential temperature indicator comprising a plurality of thermocouples, first circuit means for comparing the outputs of said thermocouples, second circuit means including chopper, biasing potentiometer, a voltage amplifier supplied from said chopper and potentiometer, a power amplifier connected to be controlled by the voltage amplifier and an indicator actuated by the power amplifier for indicating the direction and magnitudes of said outputs, said biasing potentiometer providing a reference bias of a magnitude for providing a zero indication during zero output from said thermocouples, and third circuit means shunting the output of the voltage amplifier for preventing false direction indications in said second circuit means during high reverse differential temperature thermocouple outputs.

2. A differential temperature indicator comprising a plurality of thermocouples, first circuit means for comparing the outputs of said thermocouples, second circuit means including chopper, biasing potentiometer, a voltage amplifier supplied from said chopper and potentiometer, a power amplifier connected to be controlled by the voltage amplifier and an indicator actuated by the power amplifier for indicating the direction and magnitude of said outputs, said biasing potentiometer providing a fail safe reference bias for providing a zero indication during zero output from said thermocouples, and third circuit means for preventing false direction indications in said second means during high reverse differential temperature thermocouple outputs, said third circuit means comprising a low resistance shunt circuit for said voltage amplifier for preventing an amplifier output signal.

3. A differential temperature recorder comprising a plurality of thermocouples, first circuit means for comparing the outputs of said thermocouples, second circuit means including a chopper providing a square wave output signal, a voltage amplifier tube having an anode, a cathode, and control grid, a biasing potentiometer for controlling the voltage of the anode, said control grid being connected to the output signal source, a power amplifier controlled by the voltage amplifier tube, and an indicator connected to the power amplifier tube for indicating the direction and magnitude of said outputs, said biasing potentiometer providing a reference bias for providing a zero indication during zero output from said thermocouples, and third circuit means for preventing false direction indications in said second circuit means during times of high reverse differential temperature thermocouple outputs, said third means comprising a low resistance shunting circuit for said voltage amplifier for at said times preventing amplifier output signal, said third circuit means comprising a polarizing means for at said times providing a unidirectional low resistance path and at other times providing a high resistance path.

4. A turbine differential temperature recorder comprising two pairs of thermocouples, the thermocouples of each pair being connected in opposing relationship, first circuit means including a chopper providing a pulsed output signal, a voltage amplifier tube having an anode, a cathode, and a control grid energized by said pulsed output signal, a biasing potentiometer for controlling the voltage applied to the voltage amplifier tube, a power amplifier tube connected to be controlled by the voltage amplifier tube, and an indicator connected to the power amplifier tube for indicating the direction and magnitude of outputs from said pairs of thermocouples, said voltage amplifier being biased to a state of conduction during zero output from said thermocouples, a second circuit means for preventing false direction indications in said first circuit means during high reverse thermocouple outputs, said second means comprising an amplifier output cancellation circuit for preventing said false direction indication, and timer means for alternately connecting and disconnecting said pairs of thermocouples with said first circuit means.

5. A turbine differential temperature recorder comprising two pairs of thermocouples, the thermocouples of each pair being connected in opposing relationship, first circuit means including a chopper providing a pulsed output signal, a voltage amplifier tube having an anode, a cathode, and a control grid energized by said pulsed output signal, a biasing potentiometer for controlling the voltage applied to the voltage amplifier tube, a power amplifier tube connected to be controlled by the voltage amplifier tube, and an indicator connected to the power amplifier tube for indicating the direction and magnitude of outputs from said pairs of thermocouples, said amplifier being biased to a state of conduction during zero output from said thermocouples, a second circuit means for preventing false direction indications in said first circuit means during high reverse thermocouple outputs, said second means comprising an amplifier output cancellation circuit for preventing said false direction indication, said amplifier output cancellation circuit including rectifiers for providing selected cancellation circuit phase relationship to said amplifier output, and timer means for alternately connecting and disconnecting said pairs of thermocouples to said first means.

6. A turbine differential temperature recorder comprising two pairs of thermocouples, the thermocouples of each pair being connected in opposing relationship, first circuit means for indicating the direction and magnitude of outputs from said pairs of thermocouples, said first circuit means including a voltage amplifier, said amplifier being biased to a state of conduction of a selected magnitude during zero output from said thermocouples, a second circuit means for preventing false direction indications in said first means during high reverse thermocouple outputs, said second circuit means comprising an amplifier output cancellation circuit for preventing said false direction indication, said amplifier output cancellation circuit comprising rectifiers for providing selected cancellation circuit phase relationship to said amplifier output, timer means for alternately connecting said pairs of thermocouples to said first circuit means and disconnecting them from the first circuit means, a third circuit means for converting said thermocouple output into a variable output, and fourth circuit means operable in synchronism with said third circuit means for providing a said selected cancellation circuit phase relationship.

References Cited in the file of this patent

UNITED STATES PATENTS

| | | |
|---|---|---|
| 1,361,676 | Brewer | Dec. 7, 1920 |
| 1,775,540 | Taylor | Sept. 9, 1930 |
| 2,306,479 | Jones | Dec. 29, 1942 |
| 2,413,788 | Sargeant et al. | Jan. 7, 1947 |
| 2,444,421 | Boston | July 6, 1948 |
| 2,660,883 | Wyczalek | Dec. 1, 1953 |
| 2,764,867 | Farkas | Oct. 2, 1956 |

FOREIGN PATENTS

| | | |
|---|---|---|
| 580,626 | Great Britain | Sept. 13, 1946 |